United States Patent
Wu et al.

[11] Patent Number: 5,850,324
[45] Date of Patent: Dec. 15, 1998

[54] MAGNETORESISTIVE HEAD HAVING ELECTRICALLY ISOLATED CONDUCTOR LEADS

[75] Inventors: Andrew L. Wu, Shrewsbury; Warren W. Goller, Acton; Bruce Provencher, Leicester, all of Mass.

[73] Assignee: Quantum Corporation, Milpitas, Calif.

[21] Appl. No.: 818,474

[22] Filed: Mar. 13, 1997

[51] Int. Cl.$^6$ ....................................... G11B 5/39
[52] U.S. Cl. ............................................ 360/113
[58] Field of Search .................................... 360/113, 126

[56] References Cited

U.S. PATENT DOCUMENTS

| | | | |
|---|---|---|---|
| 5,287,237 | 2/1994 | Kitada et al. | 360/113 |
| 5,483,402 | 1/1996 | Batra | 360/113 |
| 5,694,275 | 12/1997 | Watanabe | 360/113 |

OTHER PUBLICATIONS

H. Moritz, *IEEE Trans. Electron Devices,* vol. ED–32, No. 3, pp. 672–676 (1985).

*Primary Examiner*—A. J. Heinz
*Attorney, Agent, or Firm*—Janah & Associates; Debra A. Chun

[57] ABSTRACT

A magnetic head 50 comprises a substrate 55 including a magnetoresistive sensor 60 having (i) a magnetoresistive element 65 with a top surface 105, and (ii) an electrically conducting portion 75. Conductor leads 70 are electrically connected to the electrically conducting portion 75 of the magnetoresistive sensor 60. First and second dielectric isolators 100, 125 electrically isolate the conductor leads. The dielectric isolators 100, 125 terminate adjacent to, and substantially without covering, the top surface of the magnetoresistive element. Preferably, the first dielectric isolators 100 comprise (i) an inner edge 115 abutting and covering the peripheral edge 110 of the magnetoresistive sensor, and (ii) an upper surface 120 substantially in the same plane as the top surface 105 of the magnetoresistive sensor. The magnetic head 50 has superior magnetic data reading accuracy and reliability.

11 Claims, 3 Drawing Sheets

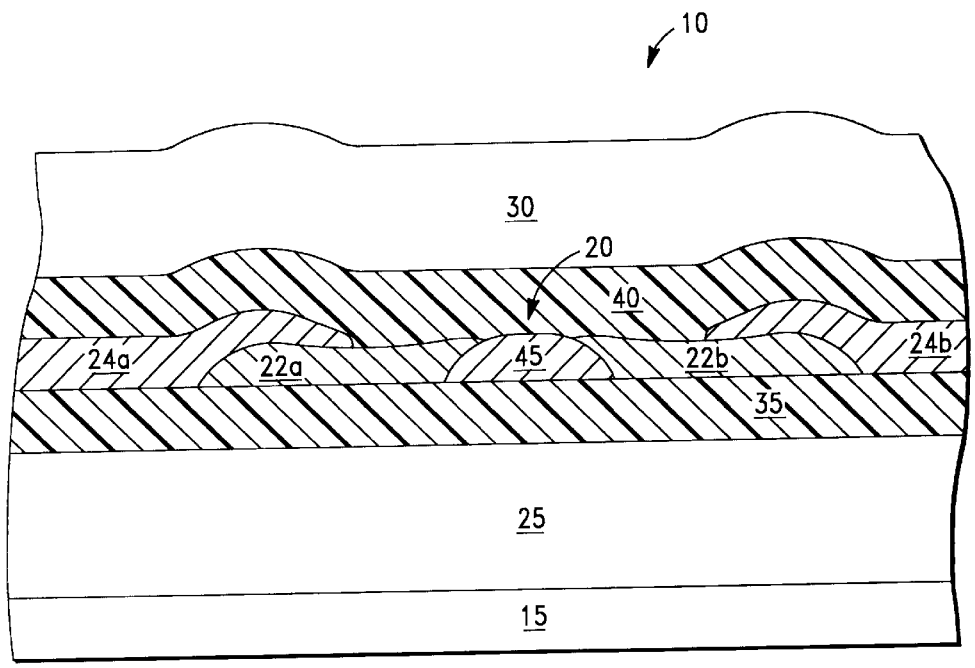
FIG.—1
(PRIOR ART)
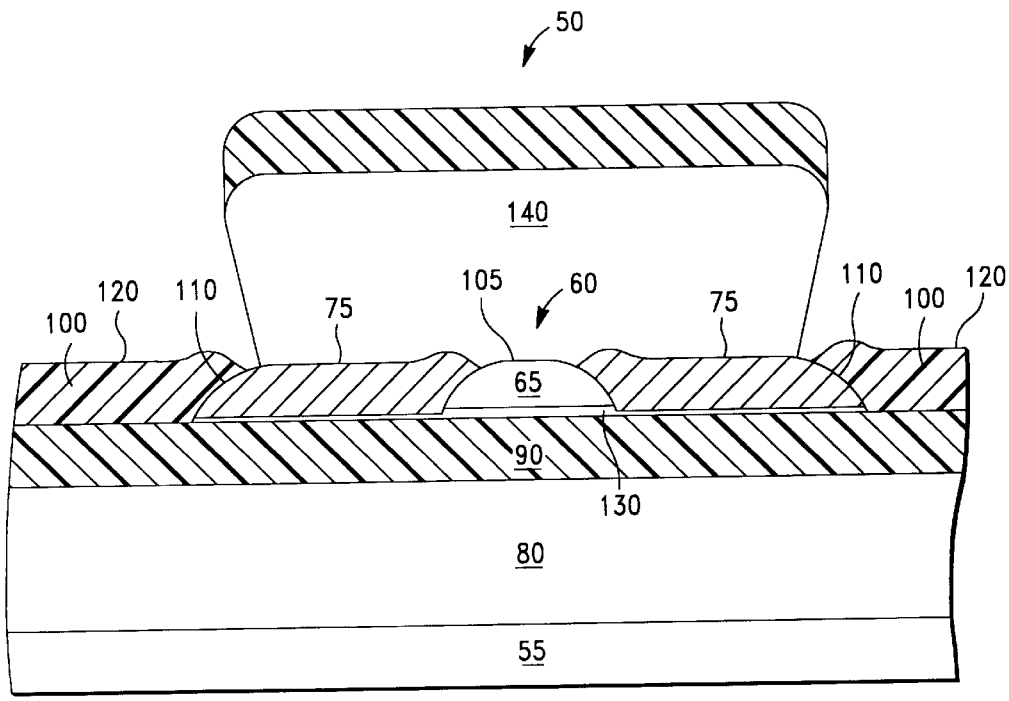
FIG.—2

MAGNETORESISTIVE HEAD HAVING ELECTRICALLY ISOLATED CONDUCTOR LEADS

BACKGROUND

The present invention relates to magnetic heads for reading and writing data on magnetic storage media.

Magnetic heads are used to read and write data on magnetic storage media such as magnetic tapes, disk drives, and recording media. A partial magnetic head structure 10, as shown in FIG. 1, is formed on a substrate 15. A magnetoresistive sensor 20 on the substrate comprises surrounding permanent magnetic elements 22a, 22b electrically connected to conductors 24a, 24b of copper or gold. The magnetoresistive sensor 20 is embedded between a first bottom shield 25 that typically comprises a magnetic Permalloy layer and a second upper (shared) shield 30 comprising a highly magnetically permeable layer or the same Permalloy layer. The sensor 20 is electrically isolated from the shields 25,30 by non-conductive, magnetically inert, read gap layers 35, 40 (such as alumina or silicon oxide layers) that surround the magnetoresistive sensor. The write element (not shown) of the magnetic head typically comprises electrically conductive coils deposited over the second shield layer, with a horseshoe-shaped magnetic pole formed around coils so that when the coils are energized in a "write" operation, a magnetic field formed around the magnetic pole magnetizes data storage media, such as disc drives and tapes, passing by the magnet head.

The magnetoresistive sensor 20 typically detects magnetic field signals through resistant changes induced in a magnetoresistive element 45 as a function of the magnetic flux being sensed. During a "read" operation, a current passed through the magnetoresistive element 45 via the conductor leads 24a, 24b detects the change in resistance induced by magnetized storage media transported past the element and results in a voltage change. The linear recording densities in narrow recording tracks make it critical that the active devices of the magnetoresistive sensor 20 are sufficiently miniaturized to allow accurate reading of fine and narrow tracks.

Modern miniaturized magnetic heads 10 are designed to provide increasingly higher areal storage densities. One method of providing higher areal storage densities is to reduce the thickness of the read gap layers 35, 40 deposited on the bottom shield and below the top shield to electrically isolate the shields from the magnetoresistive sensor 20, the permanent magnetic elements 22a, 22b, and the conductor leads 24a, 24b. Thinner read gap layers 35, 40 reduce the amount of electrical insulator overlying the magnetoresistive sensor, to provide enhanced sensitivity and accuracy of the magnetic head 10. In particular, thin read gaps reduce the "PW50" values (a measurement of the pole width at 50% of amplitude) that is a measure of the magnetic data reading performance of the magnetic head 10.

However, thinner or narrower width read gap layers 35, 40 also increase the chances of electrical shorts between the shields 25, 30 and the magnetoresistive sensor 20; the permanent magnetic elements 22a, 22b; and to a larger extent, the conductor leads 24a, 24b. Typically, during deposition of these read gap layers, pinholes, defects, and contaminant particles are formed in the deposited layers, causing electrical shorts between the different layers. This is a particular problem for the portions of the read gap layers on either side of the conductor leads 24a, 24b, which have a large surface area, and consequently, have a large number of surface defects such as pinholes. The electrical shorts through these layers can be "two-sided" electrical shorts in which the magnetoresistive sensor 20 is shunted via the shorting conductors 24a, 24b to render the sensor nonoperational; or "one-sided" electrical shorts in which one of the conductors 24a, 24b electrically shorts through one of the shield layers to form an unstable magnetoresistive sensor that provides erratic performance. The electrical shorts cause the magnetic heads 10 to exhibit unreliable performance and unstable electromagnetic properties.

Yet another problem of conventional magnetic head structures arises from the uneven surface topography of the magnetic head structure which causes layers subsequently deposited thereon to also have conformal uneven topographies. It is generally desirable for the magnetic head structures 10 to have a smooth planar surface to allow precise photolithographic imaging and patterning of conductors and other layers onto the magnetic head structure. For example, smooth and planar surfaces of the conductors 24a, 24b of the magnetic head 10 allows more conformal deposition of the second read gap layer 40, which further reduces electrical shorts between the magnetoresistive sensor 20 and the top shield layer 30 formed over the second read gap layer.

Thus, it is desirable to have a magnetic head that provides reliable electrical connections free of electrical shorts. It is also desirable to reduce the thickness of the read gap layers overlying the magnetoresistive sensor to provide enhanced magnetic read performance. It is also desirable for the magnetic head to have a substantially planar surface topography that allows more conformal planar deposition on subsequent layers. It is further desirable for the magnetic head to provide reliable and stable electrical and magnetic properties.

SUMMARY

The present invention provides a magnetic head having reliable electrical connections between the magnetic sensor and conductors; thin read gap layers that provide enhanced magnetic read performance; and a substantially planar surface topography. A magnetic head according to the present invention comprises a substrate including a magnetoresistive sensor having (i) a magnetoresistive element with a top surface, and (ii) an electrically conducting portion. Conductor leads are electrically connected to the electrically conducting portion of the magnetoresistive sensor. Dielectric isolators electrically isolate the conductor leads. The dielectric isolators terminate adjacent to, and substantially without covering, the top surface of the magnetoresistive element. Preferably, the dielectric isolators have an inner edge terminating adjacent to the top surface of the magnetoresistive element.

In another aspect, the present invention comprises a magnetic head including a substrate having a first dielectric read gap layer. A magnetoresistive sensor over the first dielectric read gap layer, comprises an peripheral edge. A first dielectric isolator comprises an inner edge abutting and covering the peripheral edge of the magnetoresistive sensor. Conductor leads formed over the first dielectric isolator electrically contact the magnetoresistive sensor. Preferably, a second dielectric isolator covers the conductor leads. A second dielectric read gap layer is formed over the magnetoresistive sensor and conductor leads. Preferably, the magnetoresistive sensor comprises a magnetoresistive element having a top surface and an upper surface of the first dielectric isolators is substantially in the same plane as the top surface of the magnetoresistive element.

In yet another aspect, the present invention comprises a method of forming a magnetic head. In the method, a first dielectric read gap layer is deposited over a substrate. A magnetoresistive sensor is formed on the first dielectric read gap layer. First dielectric isolators have (i) an inner edge abutting and covering the peripheral edge of the magnetoresistive sensor, and (ii) an upper surface substantially in the same plane as the top surface of the magnetoresistive sensor. Conductor leads are formed over the first dielectric isolators that electrically contact the magnetoresistive sensor. Preferably, a second dielectric isolator is deposited over the conductor leads. A second dielectric read gap layer is then deposited over the magnetoresistive sensor and conductor leads.

DRAWINGS

These and other features, aspects, and advantages of the present invention will be better understood from the following drawings, description, and appended claims, all of which provide illustrative examples of the invention, where:

FIG. 1 (Prior Art) is an exploded schematic view of a conventional magnetic head;

FIG. 2 is a partial sectional side schematic view of a partially processed magnetic head according to the present invention;

DESCRIPTION

The present invention provides a magnetic head having reliable electrical connections, enhanced magnetic read and write performance, and a substantially planar surface topography. In typical magnetic disc and tape drives, magnetic write elements are combined with magnetoresistive reading sensors to form a magnetic head capable of reading and writing magnetic data on magnetic storage media. Exemplary magnetic head structures are described in for example U.S. Pat. No. 3,908,194 to Romankiw et al., and U.S. Pat. No. 5,287,237 to Kitada et al., both of which are incorporated herein by reference.

Figure 4:
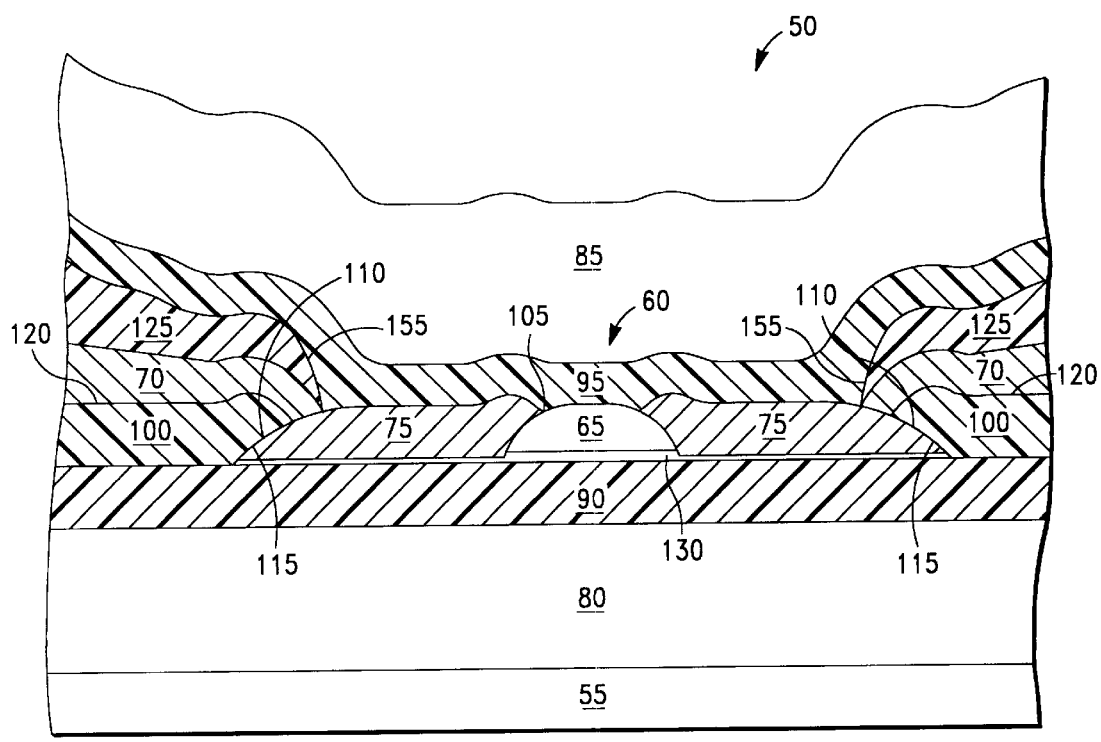
FIG. 4 is a partial sectional side schematic view of the magnetic head of FIG. 3 after completion of processing of the magnetoresistive sensor assembly.

An exemplary magnetic head 50 according to the present invention, containing a magnetoresistive sensor, will be illustrated referring to FIG. 4. It should be understood that the present invention can be used for other magnetic head structures, as would be apparent to one of ordinary skill in the art, and should not be limited in scope to the exemplary magnetic heads described herein. The magnetic head 50 is typically fabricated on a substrate 55 which preferably comprises alumina/titanium carbide composite materials. The substrate 55 is coated with a thin layer of alumina in a thickness of about 10 to 12 microns, and planarized using conventional chemo-mechanical polishing methods to obtain a smooth and planar surface.

The magnetic head 50 comprises a magnetoresistive read sensor 60 capable of reading magnetic data having high linear densities. The magnetoresistive sensor 60 typically detects magnetic field signals through resistant changes in a magnetoresistive element 65, that are induced as a function of the magnetic flux being sensed. During a "read" operation, a current passed through the magnetoresistive element 65 via conductor leads 70 (that electrically contact an electrically conducting portion 75 of the magnetoresistive element 65) detects the change in resistance induced by magnetized storage media transported past the element and results in a voltage change. The high recording densities of narrow recording tracks make it critical that the active devices of the magnetoresistive sensor 60 are sufficiently miniaturized to allow accurate reading of the narrow tracks. Also, because magnetic "writing" heads typically form zigzag domains at the edge of the magnetic track, it is desirable for the magnetoresistive element 60 to be narrower than the magnetic write element.

The magnetoresistive element 65 typically comprises various layers of soft and antiferromagnetic layers, including layers comprising Fe, Ni, Co, Mo, and mixtures thereof. In a preferred configuration, the magnetoresistive element 65 comprises a magnetoresistive layer of NiFe, a spacer layer of tantalum, and a soft adjacent layer of Ni—Fe—Mo. The electrically conducting portions of the sensor, such as the conducting permanent magnetic elements 75 surround a peripheral edge of the magnetoresistive layers, and are electrically connected to the conductor leads 70. The permanent magnet elements 75 preferably comprise hard magnetic materials that retain magnetic properties, such as cobalt-platinum alloys. The conductor leads 70 are typically fabricated from copper or gold by conventional evaporation methods. Exemplary magnetoresistive sensors are described in, for example, commonly assigned U.S. Pat. No. 5,483,402 to Batra; which is incorporated herein by reference.

The magnetoresistive sensor 60 is magnetically shielded by first and second magnetic shield layers 80, 85 and electrically isolated from the shield layers by first and second dielectric "read gap" layers 90, 95. The first or bottom shield layer 80 is electroplated on the substrate, and typically comprises a magnetically permeable Permalloy layer, such as NiFe. Thin seeding layers of metals such as NiFe are used to seed the shield layers in the electroplating processes. Only after forming the entire magnetoresistive sensor structure, a highly magnetically permeable layer, such as a CoFeX layer or the same NiFe Permalloy layer, is electroplated to serve as a second upper (shared) shield 85 covering the magnetoresistive sensor 60

The first and second dielectric "read gap" layers 90, 95 are used to electrically isolate and separate the magnetoresistive sensor 60 from the two magnetic shields 80, 85. The dielectric read gap layers 90, 95 each comprise a non-conductive, magnetically-inert layer such as alumina, silicon nitride, or silicon oxide. Preferably, as described below, read gap layers having a thin width of typically about 800 to about 1200 Å thick, are used to enhance the areal density of the magnetic data capable of being read by the magnetoresistive sensor 60. The first and second dielectric read gap layers 90, 95 are deposited on the substrate by sputtering or chemical vapor deposition methods.

In one aspect of the present invention, dielectric isolators 100, 125 are formed around the conductor leads 70 of the magnetoresistive sensor 60 to electrically isolate the leads from the conductive shields. The magnetoresistive sensor 60 has an outer peripheral edge 110, and the magnetoresistive element 65 comprises an active top surface 105. The dielectric isolators 100, 125 have an inner edge 115 terminating adjacent to the active top surface 105 of the magnetoresistive element. Preferably, the inner edge 115 of the dielectric isolators terminate on the electrically conductive portions 75 (which are typically the permanent magnet elements) of the magnetoresistive sensor. Because the active top surface 105 of the magnetoresistive element is not covered by the dielectric isolators 100, 125 the resultant structure has superior and more accurate magnetic reading properties.

The first dielectric isolator 100 has an inner edge 115 abutting and covering the peripheral edge 110 of the magnetoresistive sensor. In a preferred embodiment, the first dielectric isolators 100 have an upper surface 120 that is substantially in the same plane as the top surface 105 of the magnetoresistive element 65. The conductor leads 70 are formed over the first dielectric isolator 100 to electrically contact the magnetoresistive sensor. The first dielectric isolators 100 serve to electrically isolate the conductor leads 70 from the bottom shield 80. The second dielectric isolators 125 are used to cover the conductor leads 70 to electrically isolate the conductor leads 70 from the top shield 85. Typically, the first and second dielectric isolators 100, 125 have thicknesses of less than about 1000 Å, and more typically thicknesses of about 800 to 1000 Å.

The dielectric isolators 100, 125 are used to electrically isolate the conductor leads 70 from the top and bottom shields without deposition of excessive thickness of dielectric read gap layers below, or on the surface of, the magnetoresistive sensor 60. Whereas conventional magnetic heads have dielectric read gap layers with thicknesses in excess of about 1500 Å to provide sufficient electrical isolation of the conductor lead; the dielectric isolators of the present invention typically use read gap layers having thicknesses of less than about 1000 Å. This provides significantly enhanced read performance of the magnetic head structure, and in particular, improved PW-50 measurements that measure the pole width at 50% of amplitude.

Fabrication of an exemplary magnetic head structure 50 will now be described with reference to FIGS. 2 to 4. Initially an bottom shield layer 80 is deposited on a prepared substrate 55, as shown in FIG. 2, by conventional electroplating processes. The bottom shield layer 80 typically comprises a magnetically permeable NiFe Permalloy layer. Thereafter, a relatively thin first dielectric read gap layer 90 is formed on top of the bottom shield layer 80. The first read gap layer 90 preferably comprises a sputtered alumina layer having a thickness of about 800 to 1000 Å.

In a preferred embodiment, the magnetoresistive element 65 comprises a soft adjacent layer of NiFeMo, a tantalum spacial layer, and a NiFe magnetoresistive layer is formed over a tantalum underlayer 130. At the periphery of the magnetoresistive element are deposited permanent magnet elements 75 of a hard magnetic material such as CoPt. The permanent magnet elements 75 self-align to the magnetoresistive element and are electrically conductive to provide electrical contact to the subsequently formed conductor leads 70. The permanent magnet elements 75 are patterned using image reversal resist 140 and ion milled to provide a longitudinal bias for forming single domains.

The resist features 140 have a cross-sectional profile with a negative slope, i.e., tapering inwardly from the top to the bottom of the feature, to provide easier and cleaner lift-off of the resist features after completion of the process. Thereafter, dielectric material is deposited on the substrate to form the first dielectric isolators 100 on either side of the permanent magnet elements 75. The dielectric isolators 100 conformally deposit on the outer peripheral edge 110 of the magnetoresistive sensor to form first dielectric isolator elements having an upper surface 120 that is substantially in the same plane as the top surface 105 on the magnetoresistive element.

The first dielectric isolators 100 are deposited to a sufficient thickness to provide a planar upper surface (relatively to the existing top surface and topography of the magnetoresistive element) which is highly desirable for forming subsequent conformal and planar conductor, isolator, and read gap layers on the magnetic head. The thickness of the first dielectric isolators 100 is typically from about 800 to about 1200 Å to correspond to the thickness of the sensor 60 which is also from about 800 to about 1200 Å. The first dielectric isolators 100 reduce electrical shorts between the bottom shield 80 and the conductor leads 70 that are deposited on the magnetoresistive sensor 60. The reduced electrical shorting is also provided because the isolators 100 allow the top surface of the magnetoresistive sensor to be exposed while the transition region at the sharp outer peripheral edge 105 of the sensor is covered by the dielectric isolator elements. The resultant structure has a substantially smooth and planar upper surface upon which the conductors and remaining layers of the magnetoresistive head structure can be easily and conformally deposited without undesirable electrical shorting through the read gap layers surrounding the conductors and resultant unreliable magnetic performance.

Thereafter, the resist features 140 are removed by a resist stripping or lift-off process step, such as a chemical dissolution process. The slightly inwardly tapered or "reentrant" resist features 140 cause a shadowing effect during deposition of the dielectric layer, that results in formation of an elongated void at the edge of the bottom surface of the resist feature. It is through this void that resist removing solvent or plasma enters to dissolves the residual resist. Commonly known solvents such as acetone, η-methylpyrolidone (NMP), and "ACT-150," Ashland Chemicals, are used to dissolve the resist and complete the lift-off process. Typically, the resist is exposed to the solvent for about 10 to 60 minutes, and certain resist strippers are heated to a temperature of about 20°–80° C., in an ultrasonic bath. The layer of dielectric material deposited on top of the resist feature 140 is removed or lifted-off during this process step.

Figure 3:
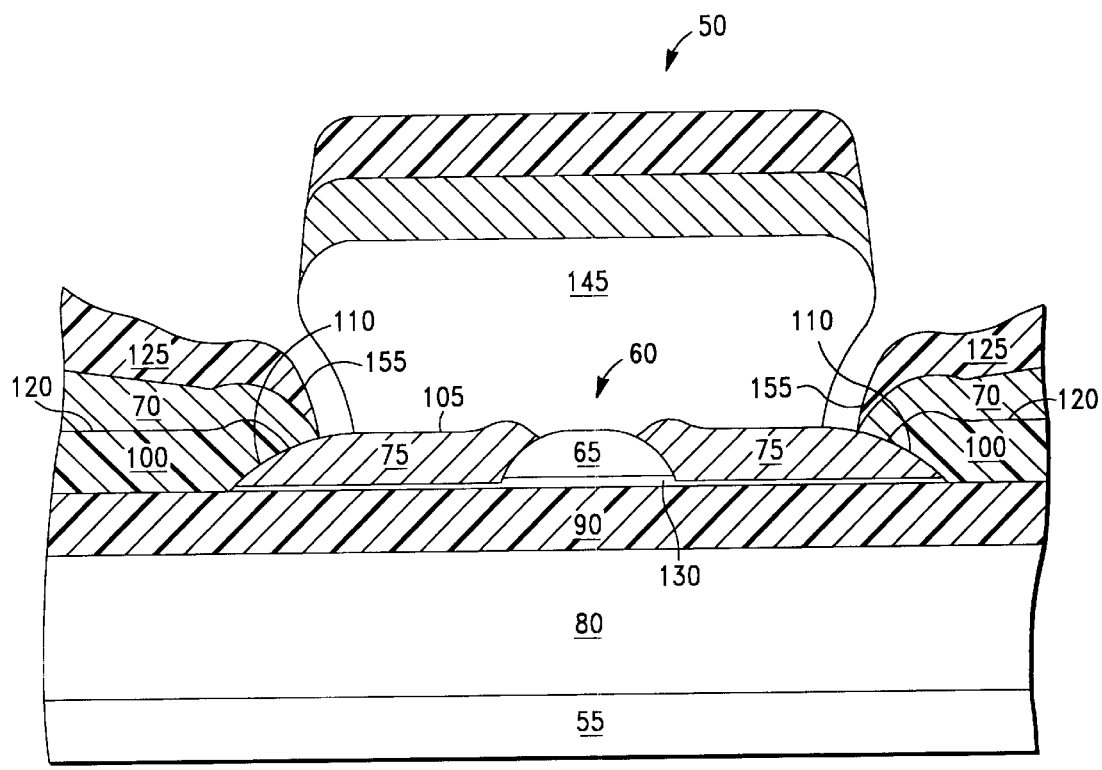
FIG. 3 is a partial sectional side schematic view of the magnetic head of FIG. 2 after further processing steps.

Thereafter, a second patterned resist layer having resist features 145 with a smaller base and more inwardly tapered sidewalls is formed to cover the magnetoresistive sensor 60 and a portion of the permanent magnet elements 75, as shown in FIG. 3. The resist features 145 expose a portion of the magnetoresistive sensor (typically the electrically conducting permanent magnet elements 75) to allow electrical contact between these elements and the subsequently deposited conductor leads 70. However, the resist features fully cover the top surface of, and prevent deposition on, the magnetoresistive element 65. A layer of electrically conductive material is then deposited on the first dielectric isolators elements 100 to form the conductor leads 70 electrically connected to the permanent magnet elements 75. The conductor leads 70 are typically deposited by the evaporation of a conductive metal, such as for example, gold or copper.

Thereafter, without removing the second photoresist features 145, optionally, second dielectric isolator elements 125 are deposited on the conductor leads 70 to cover and enclose the leads with dielectric material, as shown in FIG. 3. The second dielectric isolators 125 electrically isolate the surface of the conductor leads 70 to prevent electrical shorting between the conductor leads and the subsequently deposited top shield layers 85. The second dielectric isolator elements 125 have a tapered inner edge 155 covering the portion of the conductor lead 70 in electrical contact with the permanent magnet elements 75, and a uniform conformal deposition layer having a thickness of about 800 to about 1000 Å. The thickness of the second dielectric isolator layers 125, in combination with the second read gap layer 95 (FIG. 4), prevents electrical shorting between the conductor leads 70 and the overlying and underlying shields 80, 85. However, because the second dielectric isolators 125 do not cover the magnetoresistive sensor or permanent magnetic elements, they allow deposition of a thinner second read gap layer 95 which allows the magnetic head 60 to read higher magnetic areal densities, which offers superior performance for the magnetic head.

Furthermore, the deposition of multiple, separately deposited, dielectric isolator structures, significantly reduces the probability of electrical shorts occurring in the magnetic head structure 60. Each of the read gap layers and dielectric isolators have pinhole-type defects and electrically conductive contaminant particulates that are formed within the layer. However, because multiple deposition process steps are used to form the dielectric isolator structures, the defects formed within such structures (which are a function of the deposition process conditions and the surface nucleation characteristics of the underlying layer) are at different positions across the surface and through the thickness of the dielectric isolator structure. As a result, there is much lower probability that any two such defects will be aligned and contacting one another to form an electrical short that extends through all of the different layers. In this manner, the dielectric isolator structures serve to reduce occurrence of electrical shorting defects, and improve the reliability of the magnetic head.

Another advantage of the present process is that additional photolithographic resist patterning process steps are not required to deposit the dielectric isolator structures. The resist features 140 that are used to mill the permanent magnetic elements 75 are also used to deposit the first dielectric isolator 100; and the resist features 145 that are used to deposit the conductor leads 70 are also used to deposit the overlying second dielectric isolator structures 125. This provides a significant advantage by reducing the multiple process steps needed to remove old resist features and form new patterned resist features after each and every deposition step. Furthermore, because the resist features 145 have re-entrant sidewalls with negative profiles, the resist features 145 allow self-aligned deposition of the tapered conductor lead 70 and overlying second dielectric isolators 125. The reentrant resist features 145 result in deposition of sloped conductor leads 70 that gradually taper toward the center of the magnetoresistive sensor 60, and the deposited dielectric isolator structure 125 is shaped to cover the entire conductor lead, providing a desirable self-aligned deposition for these features.

After deposition of the second dielectric isolators 125, the resist features 145 covering the magnetoresistive sensor and permanent magnet elements is removed by a conventional resist solvent lift-off process as described above. Thereafter, a second read gap layer 95 is deposited conformally over the dielectric isolators 125, the exposed portions of the permanent magnet elements 75, and the magnetoresistive element 65. The second dielectric read gap layer 95 serves to electrically isolate the permanent magnet elements 75, the magnetoresistive sensor 60, and the conductor lead 70, from the top shield 85. However, the second dielectric read gap layer 95 can also be deposited in a thin layer without increasing the probability of electrical shorting between the underlying conductor leads 70 and the overlying top shield layer 85 because of the second dielectric isolators 125 which conformally cover and electrically isolate the conductor leads 70. The resultant magnetic head structure, as shown in FIG. 4, comprises conductor leads 70 sandwiched between the first and second dielectric isolator elements 100, 125, and embedded between the first and second dielectric read gap layers 90, 95.

Figure 5:
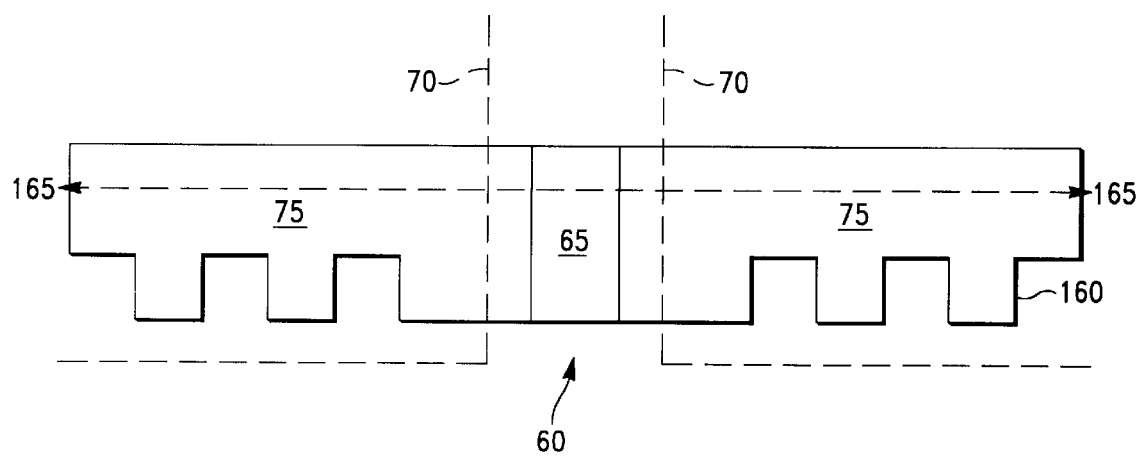
FIG. 5 is a top side schematic view of the magnetic head of FIG. 4 showing the lapping lines.

In another aspect of the present invention, to provide easier lift-off of the resist features, the magnetoresistive sensor 60 and permanent magnet elements 75 are patterned in a sawtooth layout 160, as shown in FIG. 5. The sawtooth layout 160 increases the surface area available for entry of resist dissolving solvent that dissolves the resist features from their base. At their inside corners, the photoresist features exhibit large undercut or inwardly tapered sidewalls that provide poor gap coverage at the corners resulting in a shadowing effect that forms an elongated void along the bottom surface of the resist feature. The resist removing solvent or plasma enters through this void to dissolves residual resist. Commonly known solvents such as acetone, η-methylpyrolidone (NMP), and "ACT-150," Ashland Chemicals, can be used to lift off the resist. Typically, the resist is exposed to the solvent for about 10 to 60 minutes, and certain resist strippers are heated to a temperature of about 20°–80° C., in an ultrasonic bath.

The area in the sawtooth profile 160 is lapped away during fabrication of the magnetic head "slider" structure. In the lapping step, the substrate is ground or cut through its thickness to the lap line 165 to form individual "sliders" each comprising a single or dual head assembly. The individual sliders are separated and attached to a suspension arm which is part of a head gimbal assembly that flies past the magnetic media surface during operation of the magnetic disk drive. Aerodynamic contours are formed on the air bearing surface under the lap line to reduce air turbulence on the surface of the magnetic head during operation of the disc drive, and to provide a constant fly height across from the inner diameter to the outer diameter of the magnetic disk drive.

The present invention has been described in considerable detail with reference to preferred versions that are provided only to illustrate the invention and should not be used to limit the scope of the invention. For example, the dielectric isolators can be extended or reduced in size to cover a larger portion or smaller portion of the magnetoresistive head, depending on the desired magnetic properties. Also, the dielectric isolators can be used for equivalent applications in sensors other than magnetoresistive sensors. Thus, the spirit and scope of the appended claims should not be limited to the description of the preferred versions contained herein.

What is claimed is:

1. A magnetic head comprising:
    (a) a substrate including a magnetoresistive sensor having a magnetoresistive element with a top surface, and an electrically conducting portion;
    (b) conductor leads electrically connected to the electrically conducting portion of the magnetoresistive sensor; and
    (c) first and second dielectric isolators layers that enclose and electrically isolate the conductor leads, the dielectric isolator layers terminating adjacent to, and substantially without covering, the top surface of the magnetoresistive element.

2. The magnetic head of claim 1 wherein the dielectric isolator layers further comprise one or more inner edges terminating adjacent to the top surface of the magnetoresistive element.

3. The magnetic head of claim 2 wherein electrically conducting portion of the magnetoresistive sensor comprises permanent magnet elements, and wherein the inner edges of the dielectric isolators layers terminate on the permanent magnet elements.

4. The magnetic head of claim 1 wherein the dielectric isolator layers have a thickness of less than about 1000 Å.

5. The magnetic head of claim 1 further comprising first and second dielectric read gap layers covering the magnetoresistive sensor, the read gap layers having thicknesses of less than about 1000 Å.

6. A magnetic head comprising:
   (a) a substrate comprising a first dielectric read gap layer;
   (b) a magnetoresistive sensor over the first dielectric read gap layer, the magnetoresistive sensor having a peripheral edge surrounding a magnetoresistive element with a top surface;
   (c) a first dielectric isolator layer having an inner edge abutting and covering the peripheral edge of the magnetoresistive sensor substantially without covering the top surface of the magnetoresistive element;
   (d) conductor leads over the first dielectric isolator layer to electrically contact the magnetoresistive sensor;
   (e) a second dielectric isolator layer covering the conductor leads substantially without covering the top surface of the magnetoresistive element; and
   (f) a second dielectric read gap layer over the magnetoresistive sensor and the second dielectric isolator layer.

7. The magnetic head of claim 6 wherein an upper surface of the first dielectric isolator layer is substantially in the same plane as the top surface of the magnetoresistive element.

8. The magnetic head of claim 6 wherein the peripheral edge of the magnetoresistive sensor comprises an electrically conducting portion, and wherein the inner edge of the first dielectric isolator layer terminates on the electrically conducting portion.

9. The magnetic head of claim 6 wherein the electrically conducting portion comprise permanent magnet elements, and wherein the conductor leads are electrically connected to exposed portions of the permanent magnet elements.

10. The magnetic head of claim 6 wherein the first and second dielectric read gap layers have thicknesses of less than about 1000 Å.

11. The magnetic head of claim 6 wherein the first and second dielectric isolator layers have thicknesses of less than about 1000 Å.

* * * * *